US011924706B2

(12) United States Patent
Dhoot et al.

(10) Patent No.: US 11,924,706 B2
(45) Date of Patent: Mar. 5, 2024

(54) NOTIFICATION MANAGEMENT IN PHYSICAL SURROUNDINGS

(71) Applicant: INTERNATIONAL BUSINESS MACHINES CORPORATION, Armonk, NY (US)

(72) Inventors: Akash U. Dhoot, Pune (IN); Venkata Vara Prasad Karri, Visakhapatnam (IN); Sarbajit K. Rakshit, Kolkata (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 17/447,222

(22) Filed: Sep. 9, 2021

(65) Prior Publication Data

US 2023/0076128 A1 Mar. 9, 2023

(51) Int. Cl.
*H04W 64/00* (2009.01)
*H04W 4/02* (2018.01)
(Continued)

(52) U.S. Cl.
CPC ........... *H04W 4/023* (2013.01); *H04W 4/029* (2018.02); *H04W 4/06* (2013.01); *H04W 64/00* (2013.01)

(58) Field of Classification Search
CPC ..... H04W 4/023; H04W 4/027; H04W 4/029; H04W 4/08; H04W 4/14; H04W 4/20; H04W 4/21; H04W 4/021; H04W 4/025; H04W 64/00; H04W 64/003; H04W 68/00; H04W 84/12; H04W 88/02; H04W 99/00
(Continued)

(56) References Cited

U.S. PATENT DOCUMENTS

| 8,115,625 B2 * | 2/2012 | Yoshioka | ............... H04M 11/04 379/38 |
| 8,531,294 B2 * | 9/2013 | Slavin | ................ G08B 13/2462 340/568.1 |

(Continued)

OTHER PUBLICATIONS

Lee et al., "Partitioning open-plan workspaces via augmented reality", Article in Personal and Ubiquitous Computing—Oct. 2019, 19 pages.

(Continued)

*Primary Examiner* — Joseph Arevalo
(74) *Attorney, Agent, or Firm* — Steven M. Bouknight

(57) ABSTRACT

A method, a computer program product, and a computer system manage notification settings on a user device within premises. The method includes determining a notification rule to be enforced on the premises for the notification settings to be set on the user device while within the premises. The method includes determining a location and a defined surrounding within the premises for managing the notification settings on the user device, the notification rule being based on the defined surrounding. The method includes determining a user device location of the user device within the premises. The method includes determining whether the user device location is within the defined surrounding. The method includes, as a result of the user device location being within the defined surrounding, transmitting instructions indicative of the notification rule to the user device to set the notification settings on the user device based on the notification rule.

17 Claims, 6 Drawing Sheets

(51) Int. Cl.
*H04W 4/029* (2018.01)
*H04W 4/06* (2009.01)

(58) Field of Classification Search
USPC .......... 455/456.3, 411, 414.2, 416, 418, 413,
455/563, 404.1, 41.2, 435.1, 450, 466;
370/312, 339, 328
See application file for complete search history.

(56) References Cited

U.S. PATENT DOCUMENTS

| | | | |
|---|---|---|---|
| 9,392,406 B2* | 7/2016 | Houri | H04W 4/025 |
| 9,858,676 B2 | 1/2018 | Bostick | |
| 2003/0078080 A1 | 4/2003 | Miriyala | |
| 2006/0063563 A1 | 3/2006 | Kaufman | |
| 2007/0103340 A1* | 5/2007 | Baranov | G01S 13/93 |
| | | | 340/968 |
| 2012/0115501 A1 | 5/2012 | Zheng | |
| 2014/0297758 A1* | 10/2014 | Kidron | G01C 21/3492 |
| | | | 709/206 |
| 2015/0304437 A1* | 10/2015 | Vaccari | G06F 16/28 |
| | | | 709/204 |
| 2021/0090100 A1 | 3/2021 | Rakshit | |

OTHER PUBLICATIONS

Mell et al., "The NIST Definition of Cloud Computing", National Institute of Standards and Technology, Special Publication 800-145, Sep. 2011, pp. 1-7.

* cited by examiner

NOTIFICATION MANAGEMENT IN PHYSICAL SURROUNDINGS

BACKGROUND

The exemplary embodiments relate generally to electronic notifications, and more particularly to managing sensory feedback for notification indications on user devices based on physical surroundings.

A user device may be configured to provide notifications to a user associated therewith. For example, an incoming communication such as a call, a text, an email, etc. may trigger a notification to the user. In another example, an alarm program may provide a notification to the user when a selected event (e.g., time, day, daily goal, etc.) has occurred. The notification may be provided through various sensory feedback mechanisms such as audio, visual, haptic, or a combination thereof. When the notification is triggered, based on the surroundings such as where the user is located, the notification may cause a disturbance, particularly to other individuals who may be located near the user or the user device. There may be a variety of situations where an audio notification may be highly disruptive such as an area where silence may be required. There may be other situations where a visual notification (e.g., an illumination) may be highly disruptive such as in an area with low ambient lighting. There may be still further situations where a haptic notification may also be disruptive as the haptic notification may entail an auditory component.

SUMMARY

The exemplary embodiments disclose a method, a computer program product, and a computer system for managing notification settings on a user device within premises. The method comprises determining a notification rule to be enforced on the premises. The notification rule indicates the notification settings to be set on the user device while within the premises. The method comprises determining a location for managing the notification settings on the user device. The method comprises determining a defined surrounding within the premises based on the location, the notification rule being based on the defined surrounding. The method comprises determining a user device location of the user device within the premises. The method comprises determining whether the user device location is within the defined surrounding. The method comprises, as a result of the user device location being within the defined surrounding, transmitting instructions indicative of the notification rule to the user device to set the notification settings on the user device based on the notification rule.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
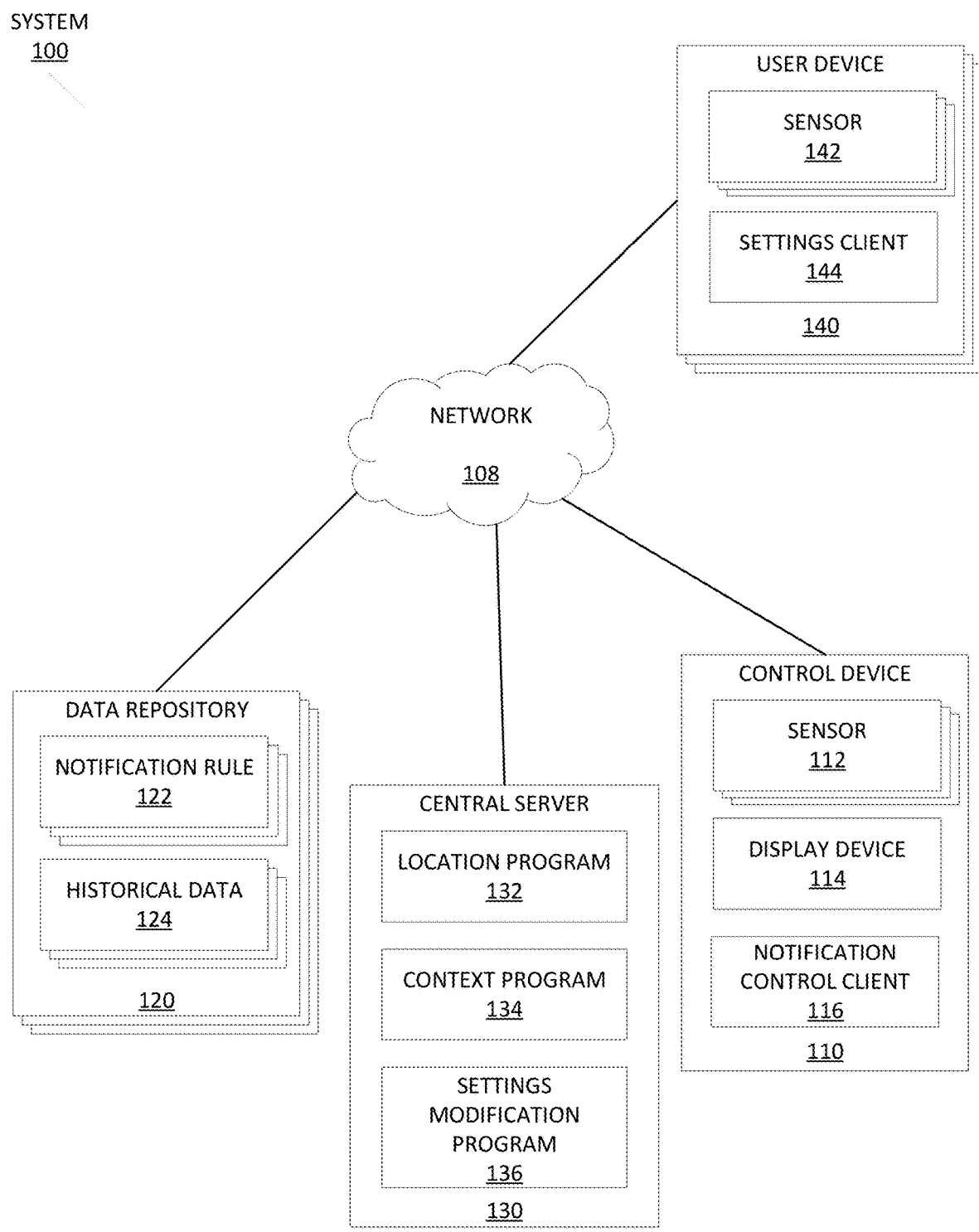
FIG. 1 depicts an exemplary schematic diagram of a notification management system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for managing notification settings on user devices. The exemplary embodiments provide a mechanism in which user devices that are in a particular set of surroundings have notification rules imposed thereon for notification settings involving sensory feedback. Within selected premises, a system according to the exemplary embodiments may ensure that notification rules directed toward notification settings are abided by user devices while on the premises. A control user may define or segment physical surroundings such that the system according to the exemplary embodiments may thereby enforce notification rules where user devices that are present within any defined surrounding on the premises may have the notification rules enforced thereon. The notification rules according to the exemplary embodiments may be dynamically applied based on location and/or context where the defined surrounding may be stationary or mobile as well as the circumstances dynamically changing for different notification settings to be used. Key benefits of the exemplary embodiments may include an automated mechanism of managing notification settings of user devices based on location and/or proximity to a defined surrounding area. Detailed implementation of the exemplary embodiments follows.

Sensory content that is generated by user devices have a tendency to create disturbances. For the user of the user device, the disturbance is welcome. However, for others not associated with the user device, the sensory content may be unwelcome, distracting, annoying, etc. A notification may be a form of sensory content where the notification may be for any event that occurs such as incoming communications. The notification may also be relatively unscheduled or performed in a passive manner from the perspective of the user where the user device triggers the notification without user intervention. The user device may generate the notification in a variety of manners and utilizing different types of sensory feedback. For example, the notification may be provided with a sensory feedback directed to auditory, visual, haptic, or a combination thereof. Depending on the surroundings in which the user device is located, the sensory feedback of the notification may create different types of disturbances. For example, if a user receives a visual notification in a dark theatre hall, a corresponding disturbance may be experienced by the other people in the surroundings. In another example, an audio notification may also create a disturbance. In yet another example, in an open office setting, different audio and visual notifications may create disturbances to fellow co-workers.

Conventional approaches have provided a variety of mechanisms to change or deactivate notification settings. For example, a conventional approach may define a zone that is designated as silent or muted. A system of this conventional approach may transmit an instruction to any device entering the zone to deactivate any auditory feature. In another example, a conventional approach detects when mobile devices enter a public area or a private area to automatically configure notification settings. However, these conventional approaches rely on static and predefined areas or zones as well as predefined settings to be used. In particular, the conventional approaches do not include a capability of defining surroundings in which to assert notification rules with regard to sensory feedback of notifications.

The exemplary embodiments are configured to provide a mechanism by which a controller defines surroundings in which notification rules are to be applied where the notification rules dynamically set notification settings on user devices based on context and/or location of the user devices relative to a control device associated with the controller. Utilizing an augmented reality environment, the controller may define the surroundings and segment the physical surroundings as well as provide different types of conditions for sensory feedback of notifications of user devices within dynamically selected ranges. Accordingly, when a user device is present within any defined surrounding as selected by the controller, the user devices recognized to be in the defined surroundings may have sensory feedback of notifications managed thereon.

The exemplary embodiments are described with particular reference to sensory feedback for notifications on user devices. However, the exemplary embodiments may be utilized and/or modified for any setting related to any operation in which an administrator or other controller desires to have within a designated area or premises.

FIG. 1 depicts a notification management system 100, in accordance with the exemplary embodiments. According to the exemplary embodiments, the notification management system 100 may include a control device 110, one or more data repositories 120, a central server 130, and one or more user devices 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

The notification management system 100 is configured to be utilized on premises where select portions of the premises may be established as one or more defined surroundings. As will be apparent to one skilled in the art, the exemplary embodiments may enable a highly dynamic approach to managing notification settings on the user devices 140. This highly dynamic approach of the exemplary embodiments may be with regard to the mechanism being used once the premises and the defined surrounding is established. However, the exemplary embodiments may also provide a highly dynamic approach to the premises being managed. For example, the purpose for which the features of the exemplary embodiments are to be used may dynamically affect how the premises and the defined surrounding are established. As will be described below, the exemplary embodiments may dynamically monitor the premises based on various conditions including location and context. In this manner, the premises may be context aware dynamic premises. For illustrative purposes, the context aware dynamic premises will be referred to simply as "premises."

In the exemplary embodiments, the network 108 may be a communication channel capable of transferring data between connected devices. Accordingly, the components of the notification management system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the notification management system 100 that do not utilize the network 108.

In the exemplary embodiments, the control device 110 may include one or more sensors 112, a display device 114, and a notification control client 116, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the control device 110 is shown as a single device, in other embodiments, the control device 110 may be comprised of a cluster or plurality of computing devices, in a modular manner, etc., working together or working independently. The control device 110 is described in greater detail as a hardware implementation with reference to FIG. 4 (e.g., data processing according to the exemplary embodiments being performed by processor 02), as part of a cloud implementation with reference to FIG. 5 (e.g., the device 110 according to the exemplary embodiments being represented by the laptop computer 54C), and/or as utilizing functional abstraction layers for processing with reference to FIG. 6 (e.g., workload layer 90 including notification setting modification processing 96 according to the exemplary embodiments). For illustrative purposes, the control device 110 is represented as a mobile computing device.

In the exemplary embodiments, the one or more sensors 112 may generate various types of data associated with information that may be used in managing notification settings of the user devices 140. In an exemplary embodiment, the sensors 112 may be a device configured to capture and/or provide images to a user. For example, the sensors 112 may include an imager such as a camera. The imager may capture images of surroundings of the control device 110. The images may also include a user of the control device 110 (hereinafter referred to as a "controller") or one or more individuals associated with the control device 110 (e.g., a patient being transported by the controller who has the control device 110). The images may be used by the system 100 to determine a variety of types of information. For example, the images may be used to determine a location based on predetermined markers. In another example, the images may be used to determine a context at a current time (e.g., whether the patient is asleep or awake, whether a theatre has dimmed the lights in preparation of starting a show, etc.). In a further example, the images may be used to extrapolate any information that may directly or indirectly be used in determining how to manage notification settings for sensory feedback of notifications on the user devices 140.

As will be described in further detail below, the images may be used in defining an area to establish a defined surrounding, a defined space, a segmented area, etc. (hereinafter collectively referred to as a "defined surrounding") around the control device 110. Thus, the controller may use an input device (e.g., a touchscreen, a mouse, etc.) and enter inputs used to create the defined surrounding. For example, the display device 114 may show the images captured by the imager to the controller. The exemplary embodiments may utilize other manners to establish the defined surrounding. According to an exemplary implementation, the sensors 112 may include an augmented reality (AR) device such as AR glasses that are worn by the controller. The AR glasses may include a transparent surface positioned over the controller's eyes that allow for the controller to view the surroundings in a substantially natural manner. The AR glasses may also be equipped to enable the controller to provide inputs that establish the defined surrounding. For example, when a particular feature is activated, the controller may manually move the area visible through the AR glasses that provide the input in establishing the defined surrounding. In another example, in a manner substantially similar to the images captured by the imager, the controller may use an input device. The AR glasses may include an imager that captured images in a perspective used by the controller in viewing the surroundings. Thus, the display device 114 may be used for such images.

The above approaches are at least partially based on manual inputs from the controller. However, the exemplary embodiments may also be configured to automatically determine the defined surrounding based on the images captured by the imager and/or the AR glasses. As will be described in further detail below, the features of the exemplary embodiments may also incorporate such a feature of automatically determining the defined surroundings. In such implementations, the controller may be provided an option to override or manually provide inputs if the defined surrounding is to be modified in a desired manner.

In another exemplary embodiment, the sensors 112 may include an audio input device such as a microphone. The audio input device may be configured to capture audio information of the surroundings. The audio information may also be utilized in determining a context at a current time. Thus, by utilizing images and/or audio information, the system 100 according to the exemplary embodiments may be configured to determine the context at the current time with a higher confidence. For example, a patient may be present in an image with eyes closed. The system 100 may determine a context being the patient is asleep. The audio input device may also capture breathing sounds where a pattern of breathing is also indicative of the patient being asleep rather than awake with eyes closed. In this manner, the context may be more accurately determined.

In a further exemplary embodiment, the sensors 112 may include a location sensor. As noted above, the images may be used to determine a location of the control device 110. In another manner, the sensors 112 may include the location sensor that may be a device dedicated to determining a location of the control device 110 within premises in which the features of the exemplary embodiments are to be utilized. The location sensor may also be a proprietary version that is to be used while in the premises. For example, the premises may include location markers that communicate with the location sensor and various techniques may be used to determine the location of the control device (e.g., triangulation with at least three location markers based on signal strengths). The proprietary version may also be directed toward the premises which may allow for location determination in a three-dimensional manner (e.g., the premises is a hospital with multiple floors). The location sensor may also or alternatively utilize any manner of determining a location in a localized manner and/or a global manner. For example, the location sensor may incorporate global positioning system (GPS) components that determines a global position. In another example, the location sensor may be constructively used with networking components (e.g., location determination based on WiFi networks, cellular triangulation, etc.).

In yet another exemplary embodiment, the sensors 112 may include a proximity sensor. The proximity sensor may provide relative location information. For example, the proximity sensor may be configured to determine a distance that the user devices 140 are from the control device 110. As will be described in further detail below, the location of the user devices 140 may provide a basis upon which to manage the notification settings as the location of the user devices 140 may be compared to a location of the control device 110. For example, the notification rules may define zones where a first zone utilizes a first set of notification rules, a second zone utilizes a second set of notification rules, etc. The zones may be defined as a distance from the control device 140. Thus, respective locations of the user devices 140 being within the zones may therefore indicate the set of notification rules to be pushed onto the user devices 140.

In an additional exemplary embodiment, the sensors 112 may include components configured to generate motion data such as orientation, position, movement, etc. For example, the sensors 112 may include an accelerometer, a gyroscope, etc. The motion information may provide yet more information that may be used in managing the notification settings. The exemplary embodiments may be configured to dynamically manage the notification settings. For example, the control device 110 may be stationary or mobile. When mobile, the control device 110 may effectively change the notification rules for certain areas in the premises as the defined surrounding is changing due to the new location being occupied by the control device 110. In this manner, the user devices 140 may be stationary but be under new notification rules from the control device 110 moving. The motion information associated with the control device 110 may therefore provide predictive information or expected locations of the control device 110 to the system 100 in preparing the user devices 140 with notification settings.

In an added exemplary embodiment for an illustrative implementation, the sensors 112 may include a patient monitor. In a particular scenario in which the features of the exemplary embodiments may be utilized, the premises may be a hospital where the controller is an individual transporting a patient from one location to another. In this scenario which will be described in further detail below, the patient monitor may include biometric sensors that monitor a state of the patient. The state of the patient may provide a context in which to determine the notification rules that are applicable to the notification settings of the user devices 140. In this manner, the patient monitor may represent a type of sensor that is particular to a type of premises where the features of the exemplary embodiments are to be used. For example, in another example, the premises may be a theatre and the sensors 112 may therefore include a light sensor (e.g., to monitor a context of whether the theatre is preparing or is currently playing a show).

In the exemplary embodiments, the notification control client 116 may act as a client in a client-server relationship and may be a software, hardware, and/or firmware based application capable of providing information used in managing notification settings via the network 108. In embodiments, the notification control client 116 may provide a user interface in which the controller may define various parameters used in managing notification settings as well as interact with one or more components of the notification management system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

The notification control client 116 may receive the data from the sensors 112 as well as receive inputs from the controller. The notification control client 116 may be configured to package the data and provide the data to be used by a further component of the system 100 (e.g., the central server 130) so that the notification settings on the user devices 140 may be dynamically updated. The notification control client 116 may transmit the data at a variety of times. For example, the features of the exemplary embodiments may be used for the control device 110 in a preliminary manner. Accordingly, the data may be provided via the notification control client 116 at a time prior to an actual use of the features of the exemplary embodiments. In another example, the features of the exemplary embodiments may be used for the control device 110 at the time the features are required. In the exemplary scenario noted above, the controller may be transporting a patient and may therefore provide the data immediately before the transporting. In a further example, the features of the exemplary embodiments may be used for the control device 110 that is stationary and/or mobile. The notification control client 116 may transmit the data while the features of the exemplary embodiments are being used. Specifically, the notification control client 116 may transmit the data continuously, intermittently, or at the occurrence of events (e.g., a change has occurred beyond a corresponding threshold). In an exemplary scenario, the notification control client 116 may transmit the data when a context is to be determined which may indicate the notification rules to be utilized. In another exemplary scenario where the control device 110 is mobile, the notification control client 116 may transmit the data to update location and/or context that is used to indicate the notification rules.

In the exemplary embodiments, the data repository 120 may include one or more notification rules 122 and historical data 124 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the notification management system 100. For example, the data repository 120 may be incorporated in the central server 130. Thus, access to the data repository 120 by the central server 130 may be performed locally. The data repository 120 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the notification rules 122 may include a set of one or more rules that indicate how notification settings directed toward sensory feedback of notifications are to be set on the user devices 140. For example, the notification rules 122 may indicate when the user devices 140 are to deactivate sensory feedback for notifications. Thus, when appropriate conditions (e.g., location and/or context) are present, the notification rules 122 may indicate that instructions are to be pushed to identified ones of the user devices 140 that satisfy the appropriate conditions to deactivate the sensory feedback for notifications, thereby managing the notification settings on those user devices 140. In another example, the notification rules 122 may indicate when the user devices 140 are to be "audio silenced" with audio notifications being deactivated or set to not exceed a particular decibel level. Haptic notifications may also be deactivated due to the resulting sounds that are created. In a further example, the notification rules 122 may indicate when the user devices 140 are to be "visually silenced" with illumination notifications being deactivated or set to not exceed a particular lumen level. With appropriate conditions being present, the notification rules may indicate that the corresponding instructions for audio and/or visual silence be set on the identified user devices 140.

The notification rules 122 may be set so that notification settings are applicable with one or more levels. Specifically, the levels may be a particular manner of defining the conditions where the conditions are directed toward a location or distance. For example, the notification rules 122 may include one or more defined surroundings for the control device 110 such as based on a distance from the control device 110 (e.g., a first defined surrounding may be set based on a first distance to create a circle or sphere around the control device 110, a second defined surrounding may be set based on a second distance greater than the first distance to create a larger circle or sphere around the control device 110, etc.). The notification rules 122 may therefore include the corresponding instructions based further on the defined surrounding.

The notification rules 122 may be directed toward a selected individual, device, premises, etc. The notification rules 122 may be stored in the data repository 120 in a variety of manners. For example, the notification rules 122 may be directed toward a particular individual such as a patient. Accordingly, the controller may determine the notification rules 122 that are to be used for the individual while the individual is on the premises for which the features of the exemplary embodiments are to be utilized. In another example, the notification rules 122 may be directed toward a particular device such as the control device 110. The control device 110 may be used for a specific purpose for which the notification rules 122 may be established. In a further example, the notification rules 122 may be directed toward particular premises. The control device 110 may be located within the premises and the notification rules 122 may be applied for conditions (e.g., location and/or context) near the control device 110 in the premises.

In the exemplary embodiments, the historical data 124 may include historical occurrences of the use of the features of the exemplary embodiments. For example, the historical data 124 may include notification rules 122 that were selected, notification rules 122 that were enforced, the location of the user devices 140 on which the notification rules 122 were enforced, the context of the control device 110 and/or the user devices 140 when the notification rules 122 were enforced, statistical data of the notification rules 122 and corresponding parameters, etc. Based on the historical data 124, the system 100 may be configured to perform historical learning through various modeling techniques such that the defined surrounding may be dynamically created based on identified contextual information. In this manner, the exemplary embodiments may be configured to automatically manage the notification settings of the user devices 140 based on the historical data 124 such that the controller may not be required to provide any input.

In the exemplary embodiments, the one or more user devices 140 may include one or more sensors 142 and a settings client 144, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the user device 140 is shown as a single device, in other embodiments, the user device 140 may be comprised of a cluster or plurality of computing devices, in a modular manner, etc., working together or working independently. The user device 140 is described in greater detail as a hardware implementation with reference to FIG. 4 (e.g., data processing according to the exemplary embodiments being performed by processor 02), as part of a cloud implementation with reference to FIG. 5 (e.g., the device 140 according to the exemplary embodiments being represented by the laptop computer 54C), and/or as utilizing functional abstraction layers for processing with reference to FIG. 6 (e.g., workload layer 90 including notification setting modification processing 96 according to the exemplary embodiments). The user device 140 may be utilized by a user who is present in premises on which the features of the exemplary embodiments may be utilized.

In the exemplary embodiments, in a substantially similar manner, the one or more sensors 142 may generate various types of data associated with information that may be used in managing notification settings of the respective user device 140. For example, the sensors 142 may also include an imager such as a camera, a location sensor, a proximity sensor, a motion sensor, etc. that operate in substantially similar manners as the counterpart component described above with regard to the sensors 112. For example, the imager may capture images of surroundings of the user device 140 that may be used to provide location and/or context information that is used in managing the notification settings on that user device 140. In another example, the location sensor may be dedicated to tracking the location of the user device 140 while on the premises. In a further example, the proximity sensor may track a distance from the control device 110 while on the premises. In yet another example, the motion sensor may track how the user device 140 is moving within the premises (e.g., approaching or moving further away from the control device 110).

In the exemplary embodiments, the settings client 144 may act as a client in a client-server relationship and may be a software, hardware, and/or firmware based application capable of providing information used in managing notification settings and receiving instructions for sensory feedback of notifications via the network 108. In embodiments, the settings client 144 may provide a user interface in which the user may be alerted to the updated notification settings as well as interact with one or more components of the notification management system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

The settings client 144 may be configured to collect sensory data from the sensors 142 and provide the data so that the notification settings may be managed on the user device 140. For example, while the user device 140 is within the premises on which the features of the exemplary embodiments are to be used and while the user device 140 remains activated, the sensors 142 and the settings client 144 may also be activated. Accordingly, so long as the user device 140 remains on the premises, the settings client 144 may provide the data from the sensors 142 so that the notification settings may be managed on the user device 140.

The settings client 144 may also be configured to receive instructions that indicate how the notification settings are to be placed. For example, the instructions may indicate that any audio notification is to be deactivated based on the current conditions of the location and the context (e.g., linked to the control device 110). In another example, the instructions may be based on different conditions such that the instructions may indicate that any audio notification or audio setting is not to exceed a determined maximum decibel level (e.g., where the determined maximum decibel level is set so that sounds from the user device 140 do not reach the control device 110 located a determined distance away and where the determined maximum decibel level is less than an overall maximum decibel level available on the user device 140). In a further example, the instructions may indicate that any visual notification is to be deactivated based on the current conditions of the location and the context (e.g., linked to the user device 140). In yet another example, the instructions may be based on different conditions such that the instructions may indicate that any visual notification or visual setting is not to exceed a determined maximum lumen level (e.g., where the determined maximum lumen level is less than an overall maximum lumen level available on the user device 140).

Upon receiving the instructions, the settings client 144 may apply the instructions and modify the notification settings on the user device 140 with particular regard to sensory feedback for notifications. As each of the user devices 140 may receive respective instructions that are specific to the location and/or context between the user device 140 and the control device 110, the instructions may be tailored to dynamically manage the notification settings for each user device 140. Based on the specific instructions that are received, the settings client 144 may enforce the corresponding notification rules that are particular to the user device 140.

In the exemplary embodiments, the central server 130 may include a location program 132, a context program 134, and a settings modification program 136, and act as a server in a client-server relationship with the notification control client 116 and the settings client 144 as well as be in a communicative relationship with the data repository 120. The central server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the central server 130 is shown as a single device, in other embodiments, the central server 130 may be comprised of a cluster or plurality of computing devices, working together or working independently. While the central server 130 is also shown as a separate component, in other embodiments, the operations and features of the central server 130 may be incorporated with one or more of the other components of the notification management system 100. For example, the operations and features of the central server 130 may be incorporated in the control device 110 or the user device 140. The central server 130 is described in greater detail as a hardware implementation with reference to FIG. 4 (e.g., data processing according to the exemplary embodiments being performed by processor 02), as part of a cloud implementation with reference to FIG. 5 (e.g., the device 110 according to the exemplary embodiments being represented by the desktop computer 54B), and/or as utilizing functional abstraction layers for processing with reference to FIG. 6 (e.g., workload layer 90 including notification setting modification processing 96 according to the exemplary embodiments).

The location program 132 and the context program 134 may determine the current conditions of the control device 110 and the user devices 140 so that the applicable notification rule may be determined for each of the user devices 140. As described above, the managing of the notification settings may be based on conditions including location and context. Accordingly, the location program 132 and the context program 134 may be configured to determine these aspects of the conditions. However, the use of location and context as the conditions is only for illustrative purposes. The exemplary embodiments may utilize further types of conditions to determine how to manage notification settings of the user devices 140. For example, the premises on which the features of the exemplary embodiments are to be utilized may have unique circumstances where sensory feedback of notifications may cause a disturbance (e.g., whereas under other circumstances, a disturbance is not registered). On such premises, the exemplary embodiments may incorporate further types of conditions to form the basis of determining the appropriate notification rule for the user devices 140.

In the exemplary embodiments, the location program 132 may be a software, hardware, and/or firmware application configured to determine a location of the control device 110 and/or the user device 140. The location program 132 may receive data from the sensor 112 and/or the sensor 142 to determine the respective locations. For example, the sensors 112 and the sensors 142 may include location sensors dedicated to tracking and monitoring a current location of the control device 110 and the user device 140, respectively, while on the premises for which the features of the exemplary embodiments are to be utilized. Thus, the location program 132 may receive the location information from the control device 110 and the user device 140. In another example, the sensors 112 and the sensors 142 may include imagers that capture images of surroundings of the control device 110 and the user device 140, respectively, while on the premises for which the features of the exemplary embodiments are to be utilized. The images may be transmitted to the location program 132 to estimate or determine a current location of the control device 110 and the user device 140.

In the exemplary embodiments, the context program 134 may be a software, hardware, and/or firmware application configured to determine a context of the conditions of the control device 110 and/or between the control device 110 and each of the user devices 140. In determining the context of the conditions of the control device 110, the context program 134 may receive the data from the sensors 112 of the control device 110. In an exemplary implementation, the notification rules 122 may be based primarily or solely on the context of the conditions of the control device 110 (e.g., the premises are relatively small that any context of the user devices 140 may be irrelevant or immaterial). Thus, the context of the control device 110 may indicate how the notification settings are to be managed on the user devices 140. However, there may be other implementations where the context of the user device 140 may contribute toward how the notification settings of the user devices 140 are to be managed. Thus, the context program 134 may utilize data from the sensors 112 and the sensors 142 to determine a relational context between the control device 110 and one of the user devices 140. For example, the context of the control device 140 may be directed toward a state of a patient being transported by a controller associated with the control device 140. Accordingly, a context of the control device 140 may be that the patient is asleep. This context may form a basis on which the notification settings are to be managed. For example, the context and a location may be used in combination to determine the proper notification setting to be used for the user devices 140.

In the exemplary embodiments, the settings modification program 136 may be a software, hardware, and/or firmware application configured to determine and transmit instructions to manage the notification settings on each of the user devices 140. The settings modification program 136 may receive the location information from the location program 132 and the context information from the context program 134. For an identified one of the user devices 140, the settings modification program 136 may determine the notification settings to be used for the identified one of the user devices 140 based on the respective location and context information associated with the identified one of the user devices 140 and the control device 110. As described above, the data repository 120 may include the notification rules 122. The notification rules 122 may include the notification settings for a given set of conditions. Accordingly, the settings modification program 136 may assess the conditions of the control device 110 and/or the user devices 140 which forms the basis to identify the appropriate notification rule 122 and the notification settings indicated by the notification rule 122. The settings modification program 136 may also utilize the historical data 124 to automatically determine the notification rule 122 to be used based on the conditions being experienced. Once the notification rule 122 is determined, the settings modification program 136 may transmit the corresponding instructions to the user devices 140 from which the settings client 144 may effectuate the corresponding change to the notification settings.

Figure 2:
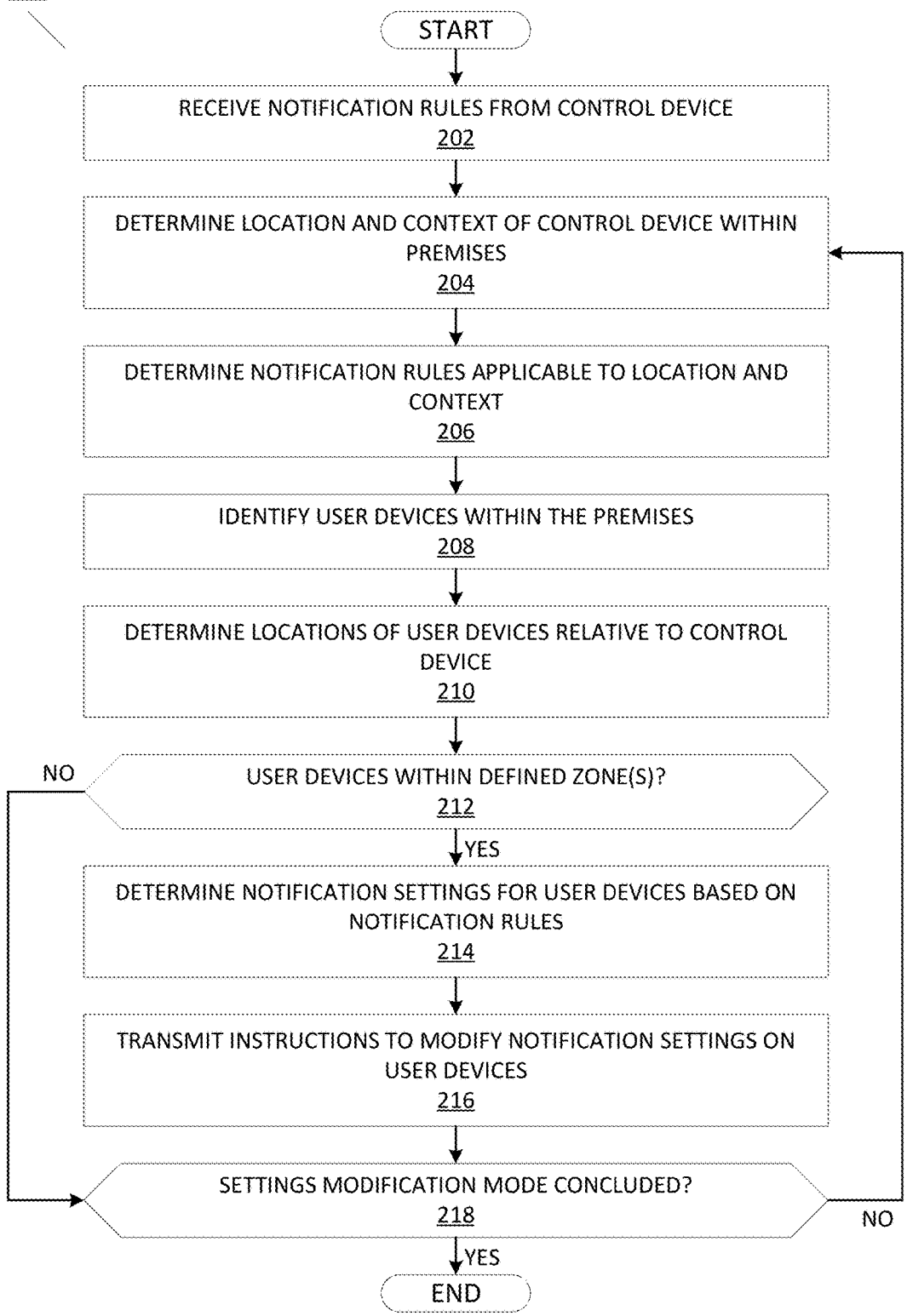
FIG. 2 depicts an exemplary flowchart of a method illustrating the operations of a central server 130 of the notification management system 100 in managing notification settings on user devices 140, in accordance with the exemplary embodiments.

FIG. 2 depicts an exemplary flowchart of a method 200 illustrating the operations of the central server 130 of the notification management system 100 in managing notification settings on user devices 140, in accordance with the exemplary embodiments. The method 200 may relate to operations that are performed by the location program 132, the context program 134, and the settings modification program 136. The method 200 will be described from the perspective of the central server 130. The method 200 will also be described with regard to specific premises on which the features of the exemplary embodiments are utilized.

The central server 130 may receive the notification rules 122 from the control device 110 (step 202). As described above, the notification control client 116 may be configured to provide a user interface on which the controller may enter inputs associated with the control device 110. The inputs may include the notification rules 122 that are to be used while the control device 110 is within the premises and the features of the exemplary embodiments are being or to be used. The controller may enter various parameters including location parameters (e.g., when the user device 140 is less than a threshold distance), context parameters (e.g., when the patient being transported by the controller is in a threshold state), and notification parameters (e.g., a particular notification setting for a sensory feedback of notifications on the user device 110 such as deactivating audio notifications). The controller may also associated the location parameters and/or the context parameters with one of the notification parameters (e.g., when the user device 140 is less than the threshold distance and the patient is in the threshold state, the user device 110 is to deactivate audio notifications). In this manner, the controller may establish the various notification rules 122 that are to be used. The notification rules 122 may be stored in the data repository 120.

It is noted that the central server 130 receiving the notification rules 122 is only for illustrative purposes. The central server 130 may be configured to receive or request the notification rules 122 when the central server 130 is incapable of establishing the notification rules 122 based on the historical data 124 with a threshold confidence. For example, the central server 130 may require a threshold number of historical occurrences for notification rules 122 to be established automatically that meet the threshold confidence. Thus, if the system 100 is in initial phases of utilizing the features of the exemplary embodiments, the historical data 124 may be insufficient to automatically establish the notification rules 122. However, once the system 100 has a sufficient amount of the historical data 124, the central server 130 may be configured to establish the notification rules 122 automatically.

While receiving the notification rules 122, in an exemplary implementation, the controller may also establish the defined surrounding for which the notification settings of the user devices 140 are to be managed. As noted above, the sensors 112 may include an imager capturing images of the surroundings, AR glasses, etc. from which the controller may segment the physical surroundings. As described above, the defined surrounding may provide a parameter in establishing a notification rule 122. For example, the controller may establish one or more defined surroundings that are zones in which a selected notification setting is to be used. In another exemplary implementation, the central server 130 may automatically determine the defined surrounding based on sensory information received from the sensors 112 (e.g., AR glasses). The zones may represent areas or spaces that extend from the control device 110. In another exemplary implementation, the zones may be selected areas or spaces that may directly or indirectly cause a disturbance for the control device 110 when a sensory feedback triggers from the user device 140.

Also noted above, the defined surrounding may be static or mobile. For example, the defined surrounding may be a space around a stretcher on which a patient is lying and the controller is transporting to a destination. In this manner, the defined surrounding is mobile while the controller is actively moving the stretcher. In another example, the defined surrounding may be an area in a theatre. In this manner, the defined surrounding is static where user devices 140 may enter or leave.

Although the defined surrounding may be established based on inputs from the controller, the defined surrounding may also be dynamic based on further conditions for the defined surrounding and/or the historical data 124. For example, through various learning approaches, the central server 130 may determine the situation (e.g., based on the data from the sensors 112) associated with the control device 110 or a selected individual. The central server 130 may also predict the situational context. The central server 130 may dynamically modify the defined surrounding (e.g., the boundaries of the defined surrounding) based on the updated situational context. The modified defined surrounding may then entail a change to the notification rule 122.

Returning to the method 200, the central server 130 may determine a location and a context of the control device 110 within the premises (step 204). As described above, the sensors 112 may generate various types of data indicative of information related to conditions of the control device 110 and/or individuals associated with the control device 110 (e.g., the controller, a patient being transported by the controller, etc.). For example, the sensors 112 may include a location sensor that tracks and monitors the location of the control device 110 within the premises. In another example, the sensors 112 may include a motion sensor that tracks and monitors changes in location of the control device 110 within the premises. In a further example, the sensors 112 may include biometric sensors that track and monitor a state of an individual associated with the control device 110. Based on the data received from the sensors 112, the location program 132 and the context program 134 of the central server 130 may determine the location and the context, respectively.

The central server 130 may determine the notification rules 122 applicable to the determined location and the determined context of the control device 110 (step 206). As described above, the notification rules 122 may indicate the notification settings to be used by the user devices 140. The notification rules 122 may also include conditions as to the applicability of the notification settings such as the location and/or the context. Accordingly, when the location and the context have been determined, the central server 130 may identify which of the notification rules 122 that may be used in managing the notification settings on the user devices 140. As will be described below, the notification rules 122 may further include conditions associated with the location and/or context of the user devices 140 that indicate the notification settings to be used.

The central server 130 may identify the user devices 140 that are within the premises (step 208). The central server 130 may utilize a variety of approaches in identifying the user devices 140 that are within the premises. For example, network association procedures with a network managed on the premises may include identification information of the user devices 140. In another example, wireless or wired communications that occur within the premises may be monitored to determine whether the user device 140 is located in the premises (e.g., Bluetooth Beacon technology, Bluetooth Lite, near field communications protocols, other near range detection technologies, etc.). In an exemplary implementation, the central server 130 and the premises may ensure that the settings modification mode and the features of the exemplary embodiments are enforced. Specifically, the premises may include a policy where all user devices 140 entering the premises must establish a connection to the central server 130 and/or to a network managed by or associated with the central server 130. In this manner, all user devices 140 that are located within the premises may be readily identified. The policy may also include a clause for users refusing to connect to the central server. Specifically, the policy may entail that those user devices 140 are to be deactivated for the duration while within the premises. The premises may further include mechanisms that may provide network usage disabling within the premises such as with a jammer or signal degradation techniques. Thus, for the user devices 140 that are activated and within the premises, the policy may allow the central server 130 to identify each of the user devices 140.

The central server 130 may determine locations of the user devices 140 relative to the control device 110 (step 210). As described above, the sensors 142 may include location sensors that monitor and track the location of the user devices 140 while within the premises in a substantially similar manner as the location sensor of the control device 110. The locations of the user devices 140 and the location of the control device 110 may thereby be used to determine relative distances of the user devices 140 from the control device 110.

The central server 130 may determine whether the user devices 140 are within a defined zone associated with a notification rule 122 of the control device 110 (decision 212). As described above, the defined surrounding may define a zone in which a notification rule may be applied such that a notification setting is to be utilized on the user device in the zone. There may also be a plurality of zones or defined surroundings as well as the dynamic modifications to the zone or defined surrounding. Thus, the notification rule 122 that may be applied may be dynamically determined when the user devices 140 are determined to be in the zone. For those user devices 140 that are outside the defined surrounding or zone (decision 212, "NO" branch), these user devices 140 may continue to operate on their notification settings without interruption.

For those user devices 140 that are within the defined surrounding or zone (decision 212, "YES" branch), the central server 130 may determine the notification settings for these user devices 140 based on the notification rules 122 (step 214). While in a given zone, the central server 130 may determine which of the notification rules 122 are applicable. The central server 130 may also incorporate the location and/or context of the control device 110 and/or the identified user device 140 within the zone. In determining the applicable one of the notification rules 122, the central server 130 may determine the notification settings to be used on the identified user device 140. The central server 130 may transmit instructions to modify the notification settings on the user devices 140 in the zone (step 216). Upon receiving the instructions, the settings client 144 on the user device 140 may apply the instructions and modify (if required) the notification settings such that the notification settings do not exceed any maximum limits on the sensory feedback of the notifications (e.g., decibel level, lumen level, etc.).

The central server 130 may determine whether the settings modification mode in utilizing the features of the exemplary embodiments has concluded (decision 218). For example, the controller may have successfully transported the patient to the destination where disturbances may not be experienced. The notification control client 116 may provide a signal or indication that the management of the notification settings of the user devices 140 is no longer being used. In another example, the control device 110 and/or the user device 140 may have exited the premises on which the features of the exemplary embodiments may be enforced. As a result of the settings modification mode being concluded (decision 218, "YES" branch), the central server 130 conclude the management of the user devices 140 either directly or indirectly via management of the notification settings for the control device 110. As a result of the settings modification mode remaining in use (decision 218, "NO" branch), the central server 130 may iteratively monitor and track the control device 110 and the user devices 140.

Figure 3:
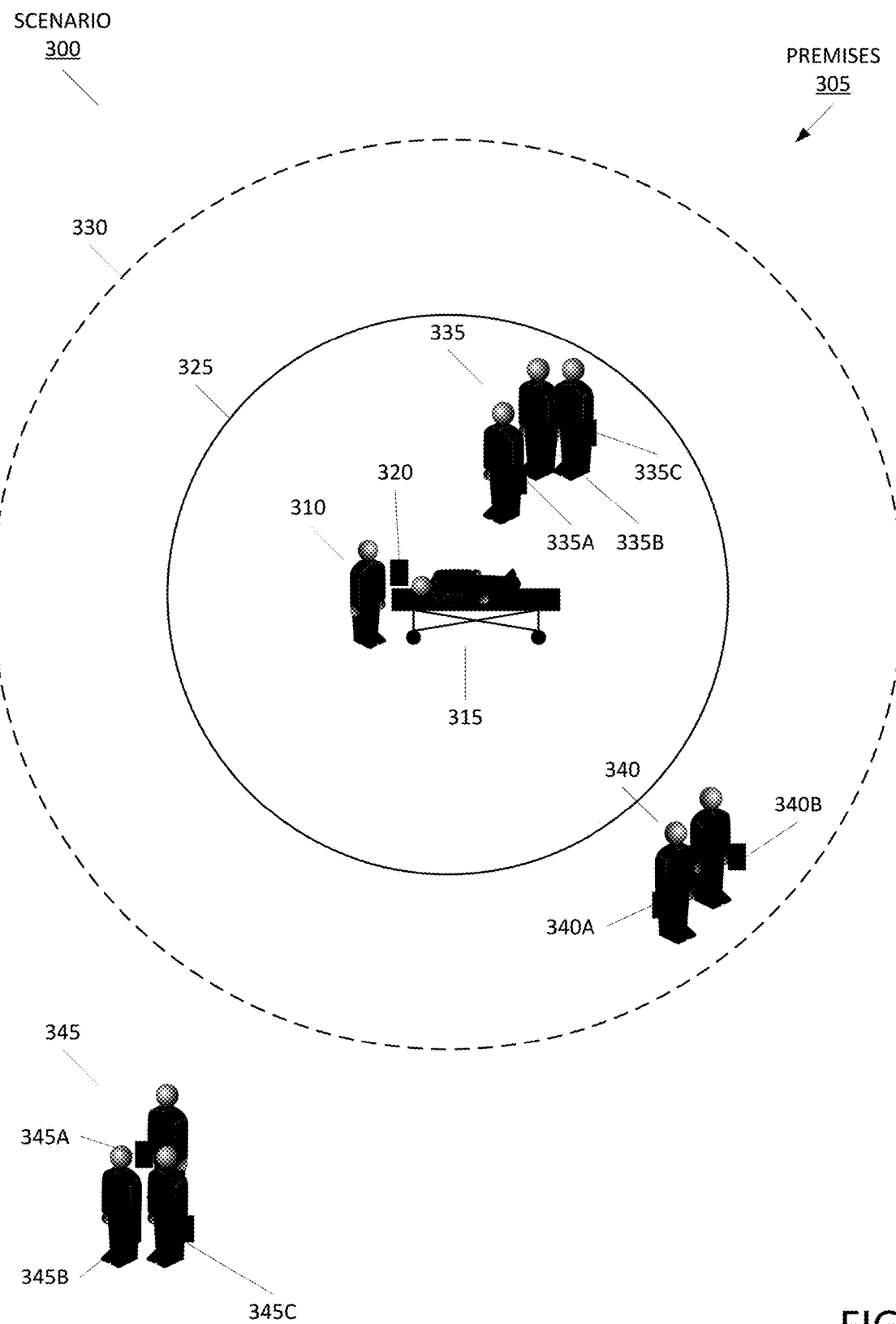
FIG. 3 depicts an exemplary scenario in which the notification management system 100 manages notification settings on the user devices 140, in accordance with the exemplary embodiments.

FIG. 3 depicts an exemplary scenario 300 in which the notification management system 100 manages notification settings on the user devices 140, in accordance with the exemplary embodiments. The exemplary scenario 300 is directed to a particular implementation of the exemplary embodiments. Thus, the scenario 300 further illustrates the operations of the control device 110 in managing the notification settings of the user devices 140.

The scenario 300 illustrates premises 305 on which the features of the exemplary embodiments may be utilized. For illustrative purposes, the premises 305 may be a hospital floor in a hospital. The premises 305 may also assume that only noise, light, or other sensory stimulus from the current floor is present. That is, noise, light, or other sensory stimulus from other hospital floors are not experienced on the current hospital floor. In this manner, the premises 305 may be considered substantially planar rather than spatial for consideration of management of notification settings of the user devices 140.

On the premises 305, there may be a controller 310 who is utilizing the control device 140 represented as a control device 320 attached to a stretcher 315. Alternatively, the control device 320 may be on the person of the controller 310. In this manner, the control device 320 may be personally associated with the controller 310 for use while on the premises 305. A patient may be lying on the stretcher 315. In utilizing the features of the exemplary embodiments, the patient may be associated with the control device 320 and therefore provide context in determining the manner in which to manage the notification settings.

The control device 320 may include a variety of sensors 112. With regard to the scenario 300 where the premises 305 is represented as a hospital floor with a patient on the stretcher 315, the sensors 112 may include a patient monitor and/or biometric sensors that provide contextual information about the patient such as a state of the patient. In this manner, the notification rules 122 may be selected based on this contextual information of the patient. The sensors 112 may also include a motion sensor that monitors and tracks a potential location of the stretcher 315 and the control device 320 where any movement is applied to a current location (e.g., as determined by a location sensor).

The controller 310 may use the control device 320 to establish the notification rules 122 that are to be used while transporting the patient on the stretcher 315 to a destination on the premises 305. As described above, the controller 310 may provide a plurality of inputs related to the notification rules. In one manner, the controller 310 may define the notification rules 122 themselves. In another manner, the central server 130 may be configured to automatically define the notification rules 122 based on the historical data 124 and utilizing various machine learning techniques.

As described above, the sensors 112 and/or the display device 114 may be embodied in AR glasses that the controller 310 may use to define one or more defined surroundings and/or provide inputs that are used in defining one or more defined surroundings that may provide a condition for the notification rules 122. As illustrated in the scenario 300, there may be a plurality of defined surroundings 325 and 330 that are established using the AR glasses worn by the controller 310 that is modularly connected to the control device 320 (e.g., short range wireless communication protocol). For example, as a preliminary operation, the controller 310 may put on the AR glasses and begin observing the surroundings. The images captured by the AR glasses may be processed by the central server 130 to define boundaries of objects (e.g., mobile objects or statis objects such as walls). The central server 130 may utilize the images from the AR glasses to determine relative dimensions of the surrounding boundaries as well as dynamically determine boundaries when the stretcher 315 is in motion. In this manner, the controller 310 may wear the AR glasses so that the central server 130 may continuously update the defined surroundings 325, 330 until the destination is reached.

As described above, the exemplary embodiments may utilize the central server 130 as an administrative device where the user devices 140 entering the premises 305 establishes a connection to the central server 130 or otherwise registers with the central server 130 to denote the presence of the user devices 140 within the premises 305. The central server 130 may further be configured to track and monitor other objects within the premises 305. For example, the central server 130 may identify each object in any surrounding within the premises 305 that may be identified with, for example, an Internet of Things (IoT) enabled system. In this manner, the central server 130 may track the stretcher 315 which may be such an IoT enabled device in the IoT enabled system. The stretcher 315 may also be identified based on the control device 320 being coupled or linked to the stretcher 315. In another example where the premises 305 represents a hospital floor, the central server 130 may track hospital beds that are located on this hospital floor. The central server 130 may also track and monitor the "smart" surrounding of each object within the premises 305. The smart surroundings may be a relative position of the object within the premises 305 and/or the defined surroundings 325, 330. The central server 130 may also consider smart surroundings to include a buffer area around the object as well as potential positions of the objects such as when the object is in motion. Through tracking of the objects as well as receiving the images from the AR glasses, the central server 130 may be configured to automatically establish the defined surroundings 325, 330. In an exemplary embodiment, the central server 130 may determine a location in which to establish the defined surroundings 325, 330. For example, based on the purpose of utilizing the features of the exemplary embodiments, the location may be predetermined, based on a location of the control device 320, etc. From the location, the central server 130 may establish the defined surroundings 325, 330 as a distance from the location (e.g., a circular area or spherical space). The scenario 300 may illustrate an instantaneous implementation while the controller 310 is transporting the patient on the stretcher 315 as well as the instantaneous positions of other objects and individuals within the premises 305. As illustrated, in this moment, the controller 310, the stretcher 315, the control device 320, and the patient may have entered a relatively open space within the premises 305. As such, the central server 130 may have established the defined surrounding 325 as a set distance from the control device 320, thereby creating a substantially circular zone. The central server 130 may have also established the defined surrounding 330 as a greater set distance from the control device 320, thereby creating a substantially larger, concentric circular zone.

At a given moment and how the defined surroundings 325, 330 are established for managing the notification settings on the user devices 140, the central server 130 may identify the user devices 140 on the premises for which the notification settings are managed. In identifying the user devices 140 (e.g., based on a policy requiring a connection thereto by the user devices 140 upon entering the premises 305), the central server 130 may also determine the location of the user devices 140 or at least a relative position of the user devices 140 to the control device 110. As illustrated, the central server 130 may determine that there may be a plurality of user devices 140 on the premises 305 represented as user devices 335A-C, user devices 340A-B, and user devices 345A-C. The user devices 335A-C may be respectively associated with a set of individuals 335 who are present in the defined surrounding 325. The user devices 340A-B may be respectively associated with a set of individuals 340 who are present in the defined surrounding 330. The user devices 345A-C may be respectively associated with a set of individuals 345 who are present outside the defined surroundings 325, 330.

In the illustrative exemplary embodiment, the central server 130 may have determined the notification rules 122 to be enforced for the premises 305 at the moment shown in the scenario 300. For example, the notification rules 122 may be determined based on a state of the patient. Thus, when the patient is awake, the notification rules 122 may indicate a predetermined level for which the patient may be disturbed by sensory feedback of notifications on the user devices 335A-C, 340A-B, and 345A-C that are on the premises 305. With regard to audio notifications or haptic notifications that cause noise, the predetermined level may allow for at least some decibel level of sounds to reach the stretcher 315 and the patient. The decibel level may be set as a threshold based on the historical data 124 that may be particular to the premises 305 and/or the patient (e.g., feedback in a survey of whether the sounds caused a disturbance and a measure of the decibels of such sounds). With regard to visual notifications, the predetermined level may allow for least some lumen level of light that is greater than an ambient lighting illuminating the area where the patient is present. In this regard, the audio notification threshold may be a value based on a ground or zero level whereas the visual notification threshold may be a relative value based on current conditions. The central server 130 may also determine the notification rules 122 such that the defined surrounding 325 utilizes first notification thresholds while the defined surrounding 330 utilizes second notification thresholds. The second notification thresholds may be greater than the first notification thresholds based on physical properties of light and sound relative to distance traveled. Accordingly, the defined surrounding 330 may allow for higher lighting and/or greater volume as the defined surrounding 330 is further away than the defined surrounding 325 to the patient.

In another state, the central server 130 may modify the notification rules 122 when the patient is asleep. For example, the notification rules 122 may modify the respective notification threshold since the level at which the patient may be disturbed in a sleep state may be lower than the level when the patient is in a wake state. In this manner, the central server 130 may determine that the notification rules 122 entail lower notification thresholds relative to the notification thresholds used in the wake state. For example, with regard to audio notifications or haptic notifications that cause noise, the predetermined level may only permit silence for the defined surrounding 325 as any noise produced within the defined surrounding 325 may create an unacceptable disturbance to the sleeping patient. As the distance from the patient or the control device 320 increases, the amount of noise or sound that may be created may increase where the sound may effectively not reach the patient. Accordingly, the audio notification threshold for the defined surrounding 330 may be a value greater than zero decibels. The audio notification threshold for the defined surrounding 330 may be determined based on the size of the defined surrounding 325 such that sounds traveling from the defined surrounding 330 are essentially muted when reaching the patient. With regard to visual notifications, the notification rules 122 may indicate that the predetermined level may actually increase when the state indicates the patient is asleep. Specifically, when the patient is asleep, the allowable visual notification threshold may increase up to a predetermined lumen level that has historically resulted in waking the patient. Substantially similar to the audio notification threshold, the visual notification threshold may increase from the defined surrounding 325 to the defined surrounding 330.

The central server 130 may also utilize the identified objects in the IoT enabled system to determine the notification thresholds. For example, the central server 130 may have identified objects that pose as mitigating objects that absorb sound and/or light. The mitigating objects may include drapes, curtains, walls, machinery, etc. that may be disposed between one of the user devices 140 and the patient. As these mitigating objects may decrease any sound or light that is transmitted from the user device 140, the central server 130 may allow for an increased notification threshold for the user device 140.

The central server 130 may also establish the defined surroundings 325, 330 dynamically based on context such as the state of the patient. Specifically, the central server 130 may determine a size of the defined surroundings 325, 330 based on the state of the patient. For example, the central server 130 may determine the notification thresholds and the size of the defined surroundings 325, 330 in a collaborative manner where each factor may be determined as a combination. Accordingly, the central server 130 may determine a distance from the patient in which to establish the defined surrounding 325 as well as the audio notification threshold for the defined surroundings 330. For example, when the patient is asleep, the central server 130 may determine that the notification rule 122 for audio notification thresholds is that the defined surrounding 325 is to observe silence from the user devices 140 but allow for a maximum audio notification threshold in the defined surrounding 330 where sounds in the defined surrounding 330 are substantially silent from the perspective of the patient. Thus, if the defined surrounding 325 is established based on a distance of three meters thereby creating a circular zone with a three meter radius, the central server 130 may determine the corresponding audio notification threshold based on this distance.

In the scenario 300 on the premises 305 where a context includes a state of the patient where the patient is asleep, the central server 130 may enforce a first set of the notification rules 122 for the user devices 335A-C that are in the defined surrounding 325. The notification rules 122 may include an audio notification threshold set to zero decibels and a visual notification threshold set to a maximum lumen level determined based on historical data that is indicative of lumen levels known to disturb sleeping patients (e.g., sufficient lumens to wake the patient). The central server 130 may enforce a second set of the notification rules 122 for the user devices 240A-B that are in the defined surrounding 330. The notification rules 122 may include an audio notification threshold set to a maximum decibel level and a visual notification threshold set to a further maximum lumen level determined based on historical data that is indicative of lumen levels known to disturb sleeping patients from light sources that are an increased distance from the patient. The central server 130 may determine that the user devices 345A-C are not required to have any of the notification rules 122 enforced as they are outside the defined surroundings 325, 330 for which the features of the exemplary embodiments are utilized to manage notification settings.

The exemplary embodiments are configured to manage notification settings for sensory feedback of notifications on user devices located within premises being managed by a central server. The central server may manage the notification settings such that the location and/or the context of the user devices may indicate the notification rule to be applied on the user device. The location and/or the context of a control device that defines the notification rules may also be used in determining the notification settings to be applied on the user device. In this manner, the user devices may be prevented from creating a disturbance while within the premises as the notification settings are managed and notification rules are enforced for these user devices. Accordingly, the exemplary embodiments may push instructions to the user devices in a dynamic manner based on the conditions being experienced rather than utilizing static notification settings for all of the user devices while on premises that are being managed.

Figure 4:
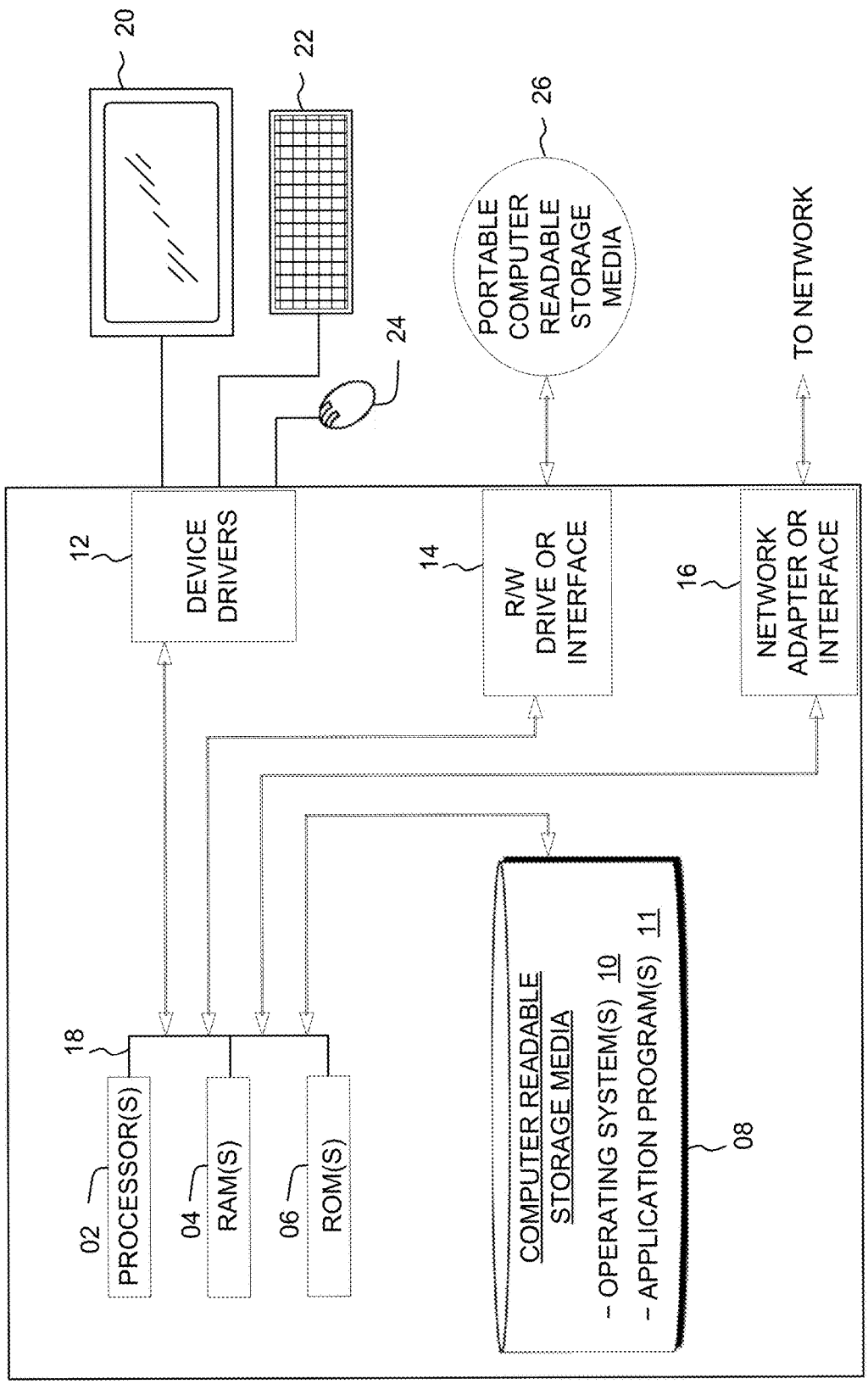
FIG. 4 depicts an exemplary block diagram depicting the hardware components of the notification management system 100 of FIG. 1, in accordance with the exemplary embodiments.

FIG. 4 depicts a block diagram of devices within the notification management system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
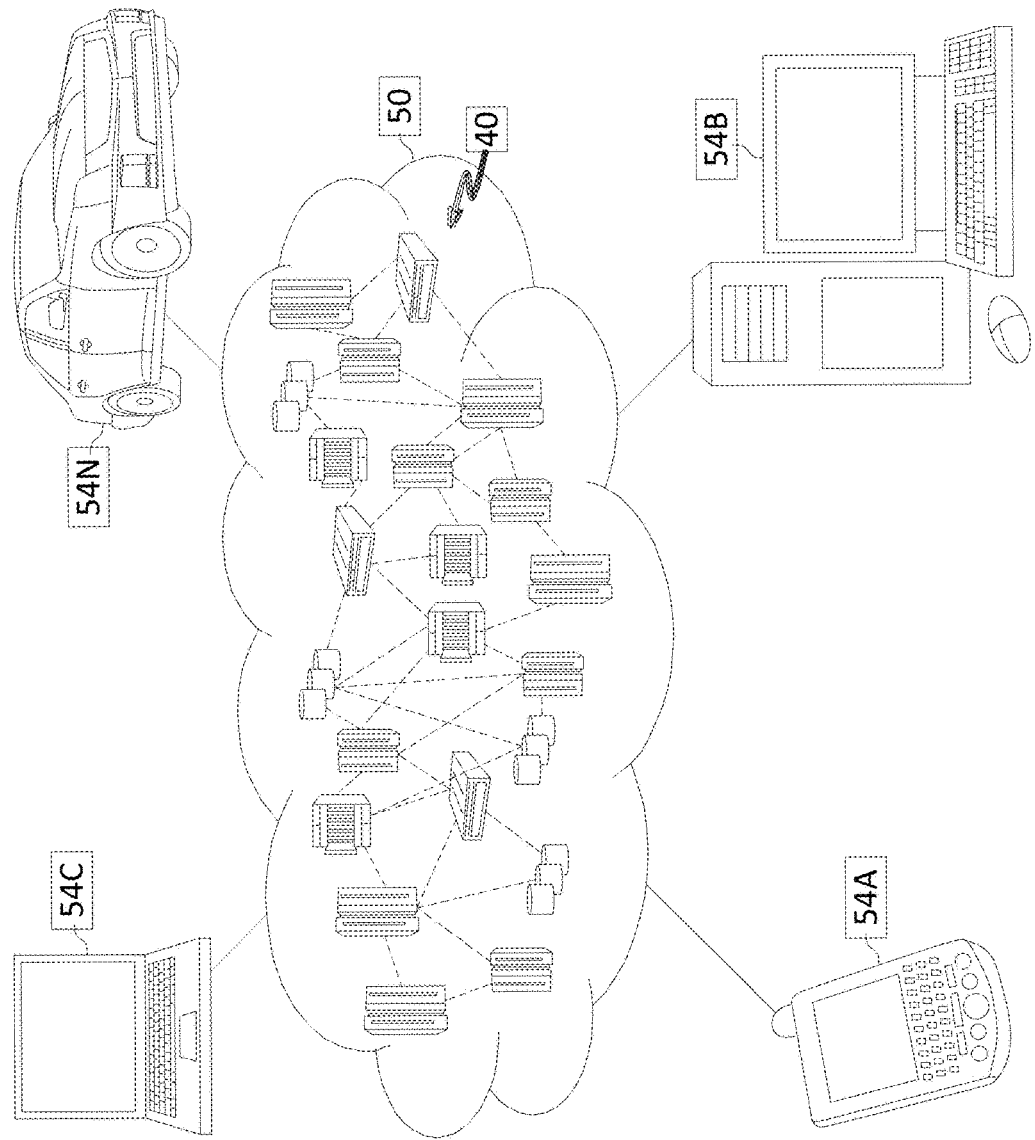
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
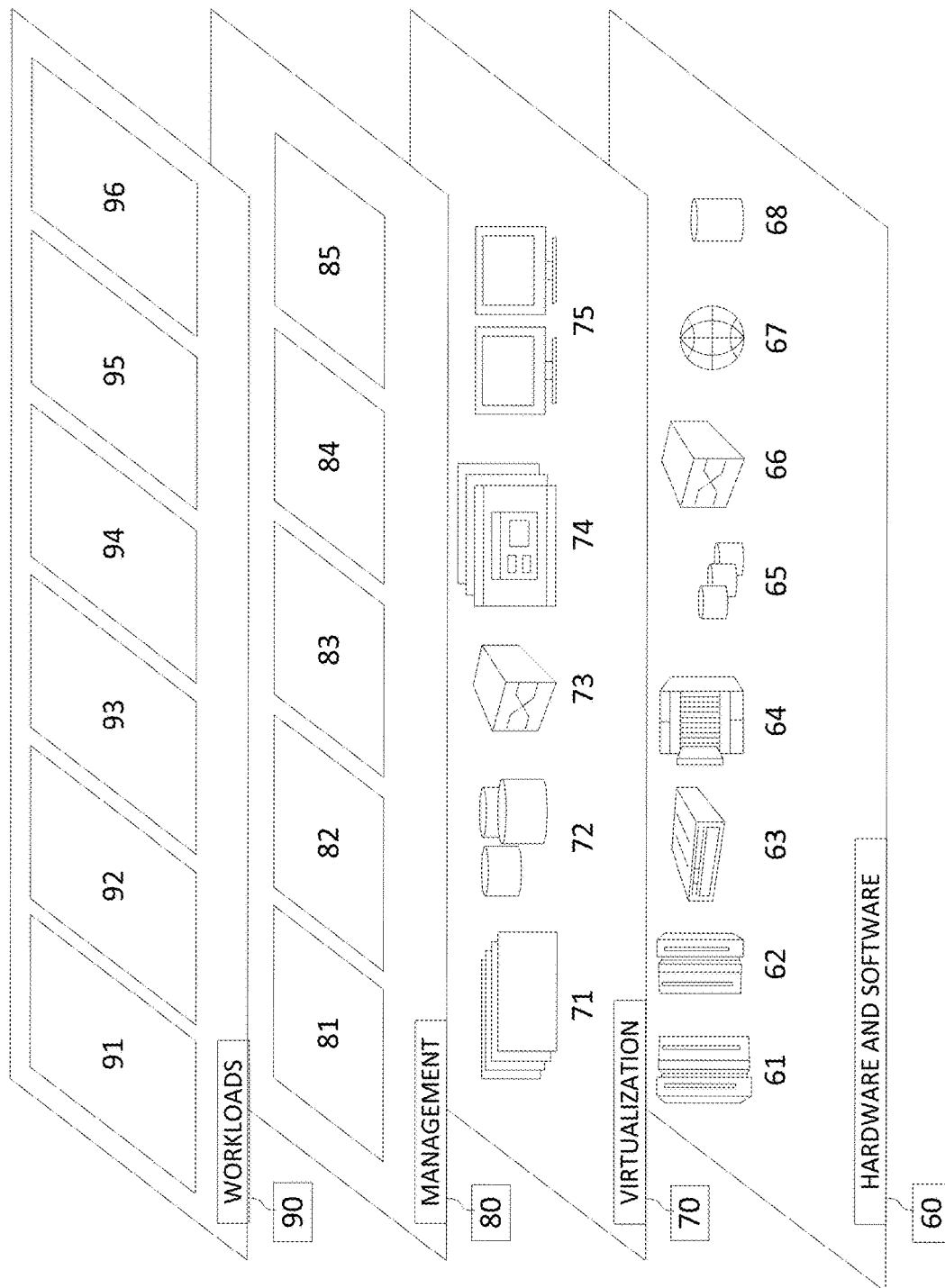
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notification setting modification processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for managing notification settings on a user device within premises, the method comprising:
   determining a notification rule to be enforced on the premises, the notification rule indicating the notification settings to be set on the user device while within the premises, wherein the notification settings include different types of sensory feedback for notifications received on the user device, and wherein the notification rule determines which type of sensory feedback from the different types of sensory feedback to set on the user device while within the premises;
   determining a location for managing the notification settings on the user device;

determining a defined surrounding within the premises based on the location, the notification rule being based on the defined surrounding;

determining a user device location of the user device within the premises;

determining whether the user device location is within the defined surrounding; and as a result of the user device location being within the defined surrounding, transmitting instructions indicative of the notification rule to the user device to set the notification settings on the user device based on the notification rule.

2. The computer-implemented method of claim 1, wherein the defined surrounding is based on a distance from the location.

3. The computer-implemented method of claim 1, wherein the location is mobile and wherein the determining the location is performed dynamically.

4. The computer-implemented method of claim 1, further comprising:

determining a context of the location, the context indicative of a state, the state being a condition for the notification rule.

5. The computer-implemented method of claim 1, further comprising:

determining a further defined surrounding within the premises based on the location, the notification rule being based on the further defined surrounding, wherein the notification rule includes a first notification threshold for the notification settings for the defined surrounding and a second notification threshold for the notification settings for the further defined surrounding.

6. The computer-implemented method of claim 1, wherein the sensory feedback involves at least one of an audio notification, a visual notification, and a haptic notification.

7. A computer program product for managing notification settings on a user device within premises, the computer program product comprising:

one or more non-transitory computer-readable storage media and program instructions stored on the one or more non-transitory computer-readable storage media capable of performing a method, the method comprising:

determining a notification rule to be enforced on the premises, the notification rule indicating the notification settings to be set on the user device while within the premises, wherein the notification settings include different types of sensory feedback for notifications received on the user device, and wherein the notification rule determines which type of sensory feedback from the different types of sensory feedback to set on the user device while within the premises;

determining a location for managing the notification settings on the user device;

determining a defined surrounding within the premises based on the location, the notification rule being based on the defined surrounding;

determining a user device location of the user device within the premises;

determining whether the user device location is within the defined surrounding; and as a result of the user device location being within the defined surrounding, transmitting instructions indicative of the notification rule to the user device to set the notification settings on the user device based on the notification rule.

8. The computer program product of claim 7, wherein the defined surrounding is based on a distance from the location.

9. The computer program product of claim 7, wherein the location is mobile and wherein the determining the location is performed dynamically.

10. The computer program product of claim 7, wherein the method further comprises:

determining a context of the location, the context indicative of a state, the state being a condition for the notification rule.

11. The computer program product of claim 7, wherein the method further comprises:

determining a further defined surrounding within the premises based on the location, the notification rule being based on the further defined surrounding, wherein the notification rule includes a first notification threshold for the notification settings for the defined surrounding and a second notification threshold for the notification settings for the further defined surrounding.

12. The computer program product of claim 7, wherein the sensory feedback involves at least one of an audio notification, a visual notification, and a haptic notification.

13. A computer system for managing notification settings on a user device within premises, the computer system comprising:

one or more computer processors, one or more computer-readable storage media, and program instructions stored on the one or more of the computer-readable storage media for execution by at least one of the one or more processors capable of performing a method, the method comprising:

determining a notification rule to be enforced on the premises, the notification rule indicating the notification settings to be set on the user device while within the premises, wherein the notification settings include different types of sensory feedback for notifications received on the user device, and wherein the notification rule determines which type of sensory feedback from the different types of sensory feedback to set on the user device while within the premises;

determining a location for managing the notification settings on the user device;

determining a defined surrounding within the premises based on the location, the notification rule being based on the defined surrounding;

determining a user device location of the user device within the premises;

determining whether the user device location is within the defined surrounding; and as a result of the user device location being within the defined surrounding, transmitting instructions indicative of the notification rule to the user device to set the notification settings on the user device based on the notification rule.

14. The computer system of claim 13, wherein the defined surrounding is based on a distance from the location.

15. The computer system of claim 13, wherein the location is mobile and wherein the determining the location is performed dynamically.

16. The computer system of claim 13, wherein the method further comprises:

determining a context of the location, the context indicative of a state, the state being a condition for the notification rule.

17. The computer system of claim 13, wherein the method further comprises:
   determining a further defined surrounding within the premises based on the location, the notification rule being based on the further defined surrounding,
   wherein the notification rule includes a first notification threshold for the notification settings for the defined surrounding and a second notification threshold for the notification settings for the further defined surrounding.

* * * * *